US012561469B2

(12) United States Patent
    Athale

(10) Patent No.:    US 12,561,469 B2
(45) Date of Patent:        Feb. 24, 2026

(54) INFERRING SCHEMA STRUCTURE OF FLAT FILE

(71) Applicant: American Express Travel Related Services Company, Inc., New York, NY (US)

(72) Inventor: Anant Athale, Scottsdale, AZ (US)

(73) Assignee: AMERICAN EXPRESS TRAVEL RELATED SERVICES COMPANY, INC, New York, NY (US)

( * ) Notice: Subject to any disclaimer, the term of this patent is extended or adjusted under 35 U.S.C. 154(b) by 0 days.

(21) Appl. No.: 18/976,038

(22) Filed: Dec. 10, 2024

(65) Prior Publication Data

US 2025/0117510 A1      Apr. 10, 2025

Related U.S. Application Data

(63) Continuation of application No. 17/565,628, filed on Dec. 30, 2021, now Pat. No. 12,197,606.

(51) Int. Cl.
    *G06F 16/10*        (2019.01)
    *G06F 16/11*        (2019.01)
    *G06F 21/62*        (2013.01)

(52) U.S. Cl.
    CPC ........ *G06F 21/6218* (2013.01); *G06F 16/116* (2019.01)

(58) Field of Classification Search
    CPC . G06F 21/6218; G06F 16/116; G06F 21/6245
    See application file for complete search history.

(56) References Cited

U.S. PATENT DOCUMENTS

| | | | |
|---|---|---|---|
| 10,983,967 B2 | 4/2021 | Tsirogiannis | |
| 11,599,512 B1 | 3/2023 | Liu | |
| 2005/0097561 A1 | 5/2005 | Schumacher | |
| 2005/0114405 A1 | 5/2005 | Lo | |
| 2005/0132276 A1 | 6/2005 | Panditharadhya | |
| 2006/0117250 A1 | 6/2006 | Rothschiller | |
| 2006/0259519 A1 | 11/2006 | Yakushev | |
| 2007/0083538 A1 | 4/2007 | Roy | |

(Continued)

OTHER PUBLICATIONS

Article entitled "Flat File Schema Developer's Guide", by Software AG, dated Oct. 2019 (Year: 2019).*

(Continued)

*Primary Examiner* — Mahesh H Dwivedi
(74) *Attorney, Agent, or Firm* — Thomas | Horstemeyer, LLP

(57) ABSTRACT

Disclosed are various embodiments for inferring a schema for a flat file when a corresponding schema file defining the structure of the data included in the flat file is not available. In some examples, a trained schema inference model can be used to determine the corresponding schema defining the data structure and relationships of the data include the flat file. In other examples, statistical analysis and pattern detection is used to determine the corresponding schema of the flat file. Once a flat file schema is defined, a compliance analysis can be performed to ensure that the data of the flat file conforms with various privacy and compliance regulations. If a compliance issue is detected, the flat file can be flagged for manual review and/or modified to rectify the compliance issue.

20 Claims, 5 Drawing Sheets

(56)                    References Cited

U.S. PATENT DOCUMENTS

| | | |
|---|---|---|
| 2017/0220606 A1 | 8/2017 | Wang |
| 2019/0124202 A1* | 4/2019 | Dubey ........... G06Q 10/063112 |
| 2019/0197359 A1* | 6/2019 | Haneda ................... G06N 3/08 |
| 2021/0232703 A1 | 7/2021 | Lvkushkin |
| 2021/0390119 A1 | 12/2021 | McNamara |

OTHER PUBLICATIONS

YouTube video entitled "Spark Optimization with Demo", uploaded on Oct. 25, 2020, by Shahul, available at https://www.youtube.com/watch?v=x2qXLeR8_LI (Year: 2020).*
Article entitled "Evaluation of PHI Hunter in Natural Language Processing Research", by Redd et al., dated 2015 (Year: 2015).*
YouTube video entitled "Spark Optimization with Demo", by Shahul, uploaded on Oct. 25, 2020, available at https:// www.youtube.com/watch?v=x2qXLeR8_LI) (Year: 2020).
Article entitled "Orchestrate an ETL pipeline using AWS Glue workflows, triggers, and crawlers with custom classifiers", by Mehta et al., dated Nov. 15, 2021 (Year: 2021).
Article entitled "How to Export Customers Data in CSV File by Php Script", by Hung, dated Jan. 12, 2018 (Year: 2018).
Article entitled "Infer Schema for Large CSV File Hosted in AWS S3", by Danilov, dated Dec. 26, 2020 (Year: 2020).

* cited by examiner

Computing Environment(s) 203

Computing Environment Data Store 224

Flat File(s) 109

Inferred Flat File Schema 106

Schema Inference Rules 218

Schema Inference Model(s) 136

Compliance Rules 221

Schema Inference Engine 103

Compliance Engine 215

Network 212

Data Destination System 209

Data Destination Service 233

Data Destination Data Store 236

Flat File(s) 109

Data Source System 206

Data Source Service 227

Data Source Data Store 230

Flat File(s) 109

FIG. 2

200

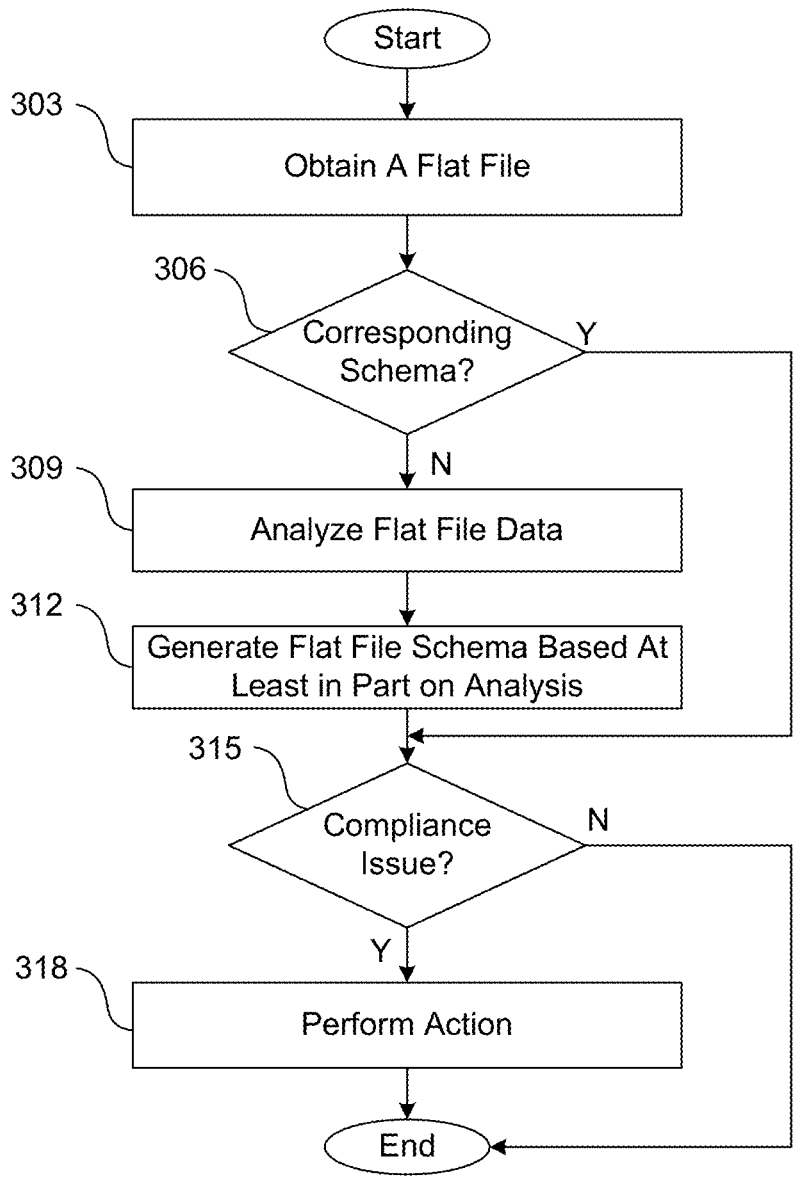
FIG. 3
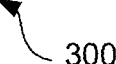

INFERRING SCHEMA STRUCTURE OF FLAT FILE

CROSS REFERENCE TO RELATED APPLICATION

This application is a continuation of prior U.S. application Ser. No. 17/565,628 filed Dec. 30, 2021, entitled INFERRING SCHEMA STRUCTURE FROM FLAT FILE, which is hereby incorporated by reference in its entirety.

BACKGROUND

Financial data can be exchanged between multiple entities within a financial institution as well as with external third-party entities (e.g., a merchant system). In various examples, the financial data can be exchanged between the different entities in the form of a flat file where the data is stored in a single file in the form of rows and columns, with no structure for indexing and no structural relationships between records. In some situations, a flat file containing records of user financial data may be exchanged or stored in a data storage without the corresponding schema used to discern the data structure and the data labels (e.g., account number, account name, etc.) associated with the data. A lack of a document schema can make it difficult to identify data issues associated with the flat file, which can further result in compliance and security concerns with respect to the data included in the file. For example, the data issues can relate to personal identifiable information (PII) integrity enforcement, data localization enforcement, data privacy enforcement, ingestion delays, transformation errors, and/or other issues.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2 is a drawing of a network environment according to various embodiments of the present disclosure.

FIG. 3 is a flowchart illustrating one example of functionality implemented as portions of a schema inference engine and compliance engine executed in a computing environment in the network environment of FIG. 2 according to various embodiments of the present disclosure. In particular, FIG. 3 relates to inferring a flat file schema for a flat file and identifying compliance issues associated with the data based at least in part on the flat file schema.

DETAILED DESCRIPTION

Figure 1:
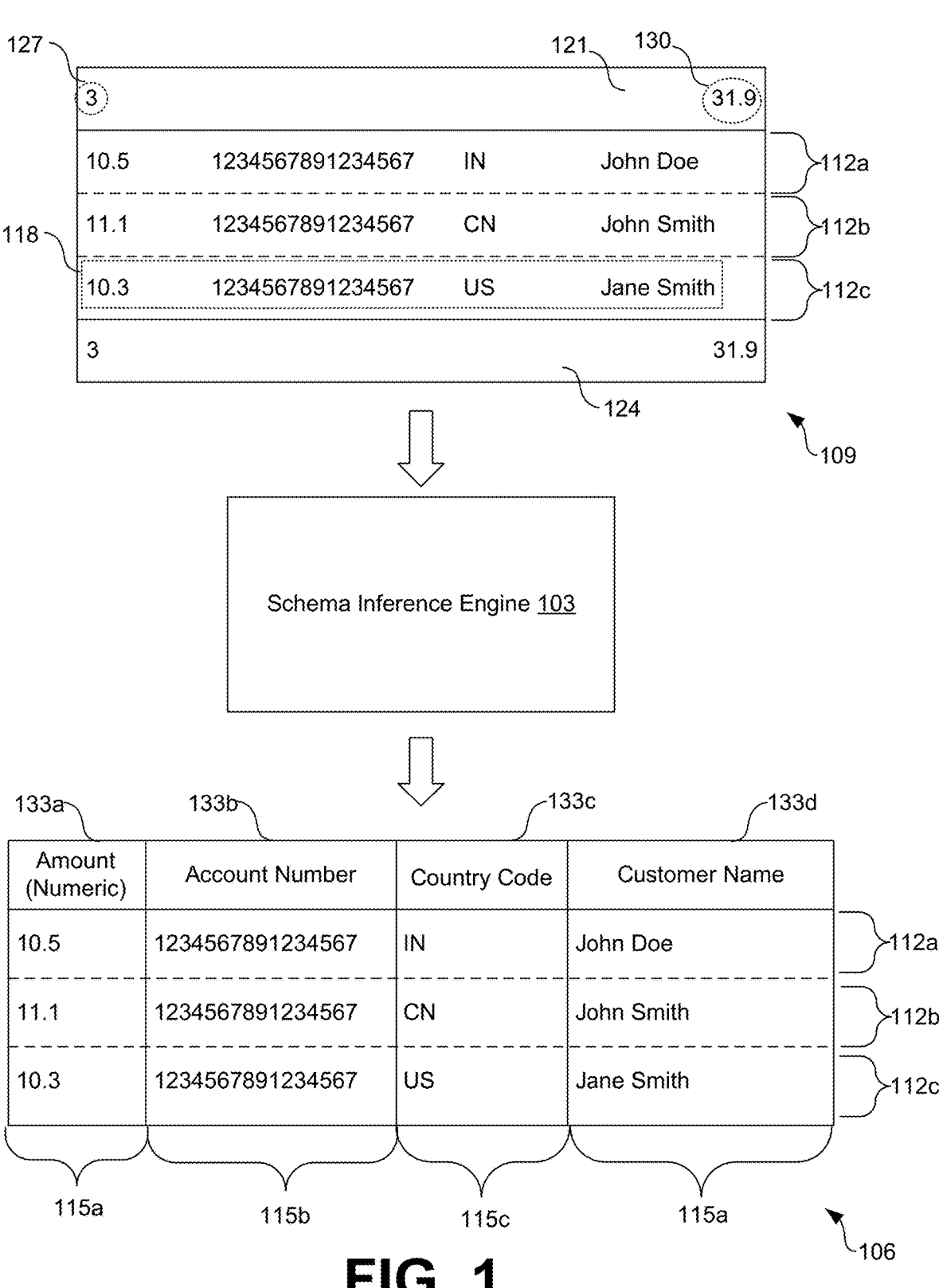
FIG. 1 is a drawing depicting one of several embodiments of the present disclosure.

Disclosed are various approaches for inferring a schema for a flat file when a corresponding schema file defining the structure of the data included in the flat file is not available. In some examples, a trained schema inference model can be used to determine the corresponding schema defining the data structure and relationships of the data include the flat file. In other examples, statistical analysis and pattern detection is used to discern the corresponding schema of the flat file. For example, the flat file can be analyzed to detect the rows and columns of data included in the flat file, and the data included in each column can be further analyzed to identify the type of data included in a given column. Once a flat file schema is defined, a compliance analysis can be performed to ensure that the data of the flat file conforms with various privacy and compliance regulations. If a compliance issue is detected, the flat file can be flagged for manual review and/or modified to rectify the compliance issue.

A flat file corresponds to a file comprising data stored in a plain text format with no structural markup to delineate the meaning of the data. For example, a flat file may include a delimited text file, a CSV (comma-separated values) file, and/or any other suitable flat file structure. In various examples, a flat file comprises a table of rows and columns where each row corresponds to a record of data and each column corresponds to a data field for a type of data included in the column. However, without knowledge of the data structure for indexing or the structural relationship between the data records, the meaning of data can be difficult to discern. Typically, a flat file has a corresponding schema file that contains the metadata for understanding the structure associated with the flat file. However, in various situations, the schema may not accompany the flat file in storage or in exchange between computing systems. For example, the schema document may get corrupted or get lost in transmission. In other examples, the corresponding schema may not be transmitted to the receiving party due to one or more permissions associated with the flat file and/or the receiving party.

In various examples, a financial document containing records of transactional data may be exchanged or stored in the form of a flat file. For example, a merchant may create a flat file including transaction data records for transactions using payment accounts associated with a particular issuer. The merchant may transmit the transaction data flat file to the issuer, and the issuer may store the flat file in a data store associated with the issuer. In some examples, each transaction record may identify a transaction amount, an account name, a transaction account number, an account holder name, a merchant name, a country code associated with the transaction account, and/or other type of transactional data. As the data included in a transaction record may contain personal identifying information associated with the account holder involved with the transaction, it is imperative that the data included within the file is secure and in compliance with both privacy and localization rules. However, if the flat file lacks a corresponding schema to understand what the data represents, it can be difficult to identify data issues (e.g., nonconformity with compliance and privacy regulations) associated with the flat file.

Turning now to FIG. 1, shown is an example diagram illustrating how a schema inference engine 103 is used to infer a flat file schema 106 associated with a flat file 109 according to various examples. To begin, the flat file 109 of FIG. 1 comprises a table of three rows 112 (e.g., 112*a*, 112*b*, and 112*c*) and four columns 115 (e.g., 115*a*, 115*b*, 115*c*, and 115*d*). Each row 112 includes a record 118 comprising a discrete information string of characters and/or numbers. The data included in the flat file 109 is stored within the flat file 109 such that without a corresponding schema file defining the structure of the data, the discrete information string included in each record 118 has no discernable meaning.

In the example of FIG. 1, the flat file 109 further includes a header 121 and a footer 124. In various examples, the header 121 and/or footer 124 can contain information about the flat file 109. For example, the information included in the header 121 and/or footer 124 can be used to identify data corruption or data loss during transmission of the flat file 109 from one entity to another entity. In the example of FIG. 1, the header 121 and the footer 124 both include a row count 127 and an amount sum 130. In various examples, the row count 127 can be used to identify the number of rows 112 included in the flat file 109. In various examples, the transaction amount sum 130 can comprise a sum of the values corresponding to the transaction amount included in column 115*a* for each record 118.

Once the transaction amount values are identified by the inferred flat file schema 106, the transaction amount sum 130 can be used to verify an accuracy of the data included in the flat file 109. However, it should be noted that in some examples, the flat file 109 can lack one or both of a header 121 or a footer 124. It should be further noted that the row count 127 and the amount sum 130 are examples of values that can be included in the header 121 and/or the footer 124 for verification, and the header 121 and/or footer 124 are not limited including one or both of the row count 127 or the amount sum 130.

As shown in FIG. 1, a schema inference engine 103 analyzes the flat file 109 and outputs an inferred flat file schema 106 for the flat file 109 based at least in part on the analysis. In the example of FIG. 1, the flat file 109 corresponds to a financial document that includes records 118 of transactional information (e.g., a transaction amount, an account identifier, a country code, and a customer name). The flat file schema 106 that is inferred by the schema inference engine 103 identifies the structure for and the meaning of the data included in the flat file 109. In particular, the flat file schema 106 inferred by the schema inference engine 103 identifies the data fields 133 (e.g., 133*a*, 133*b*, 133*c*, and 133*d*) corresponding to the type of data included the portion of the data of the discrete information string that is included in a corresponding column 115. In some examples, the flat file schema 106 comprises a separate structured document that is structured according to the inferred schema 106. In other examples, the flat file schema 106 comprises a metadata file that defines how the flat file 109 is structured and the relationship between the various records 118 and data included in the records 118.

In some examples, the schema inference engine 103 provides a flat file 109 as an input to a trained schema inference model 136 (FIG. 2) to determine the corresponding flat file schema 109 defining the data structure and relationships of the data include the flat file 109. For example, a schema inference model is trained using a plurality of historical flat files 109 and corresponding schemas 106 to learn how to infer the flat file schema 106 for a given flat file 109. In various examples, the schema inference model 136 can be trained using supervised or unsupervised training methods. In various examples, the schema inference model 136 uses classification algorithms (e.g., logistic regression, neural networks, etc.) to classify the data included in a given column 115 of a flat file 109 based at least in part on the historical data.

In other examples, the schema inference engine 103 provides statistical analysis and pattern detection within the data of the flat file 109 to discern the corresponding flat file schema 106. For example, the flat file 109 can be analyzed to detect the rows 112 and columns 115 of the record data included in the flat file 109. The portion of the record data that is included in each column 115 and row 112 can be further analyzed to identify the type of data that is included in a given column 115. For example, the schema inference engine 103 can identify that a portion of data included in the discrete information string for each record 118 and represented by a given column 115 includes fifteen numbers. Based on this pattern and the characteristics of the portion of data, the schema inference engine 103 can conclude that the type of data included in the particular column 115 corresponds to an account number. In addition, for another column 115, the schema inference engine 103 can identify that the data included in the column 115 appears to correspond to a country code for each record 118. Accordingly, the schema inference engine 103 uses statistical analysis and pattern detection to generate a flat file schema 106 for a flat file 109.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

With reference to FIG. 2, shown is a network environment 200 according to various embodiments. The network environment 200 can include a computing environment 203, a data source system 206, and a destination source system 209, which can be in data communication with each other via a network 212.

The network 212 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 212 can also include a combination of two or more networks 212. Examples of networks 212 can include the Internet, intranets, extranets, virtual private networks (VPNs), and similar networks.

The computing environment 203 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 203 can employ a plurality of computing devices that can be arranged in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource or any other distributed computing arrangement. In some cases, the computing environment 203 can correspond to an elastic computing resource where the allotted capacity of processing, network, storage, or other computing-related resources can vary over time.

Various applications or other functionality can be executed in the computing environment 203. The components executed on the computing environment 203 include a schema inference engine 103, a compliance engine 215, and other applications, services, processes, systems, engines, or functionality not discussed in detail herein.

The schema inference engine 103 can be executed to analyze a flat file 109 and infer a flat file schema 106 defining the structure and relationships of the data included in the flat file 109. In various examples, the schema inference engine 103 analyzes the data included in the flat file 109 using schema inference rules 218 to identify the rows 112 and columns 115 of a table included in the flat file 109. For example, the schema inference engine 103 can analyze the data included in the flat file 109 to identify patterns in the data representing the rows 112 and columns 115. For example, row level patterns can be identified in the data to identify the start of a record 118, thereby the start of a row 112.

Similarly, the schema inference engine 103 can identify column level patterns included in the data such as data within records 118 that start with a similar string value. In some examples, the schema inference engine 103 can recognize spaces between sections of data in a given discrete information string and estimate the boundaries of each column 115. In some examples, statistical operations can be applied on numerical columns 115 to obtain data distribution sums, minimums, maximums, means, and standard deviations associated with each discrete information string.

Upon identifying the rows 112 and columns 115 associated with the data of the flat file 109, the schema inference engine 103 can analyze the data to identify the type of data represented by a given column 115. For example, the schema inference engine 103 can use regular expressions identified in the schema inference rules 218 and compare the regular expressions with the data included in a given column 115 to determine the type of data. In this example, a regular expression for an account number could be expressed using the notation of "^[0-9]{15}". As such, the schema inference engine 103 can determine that a string of fifteen numbers between 0 and 9 corresponds to the account number.

According to various examples, the schema inference engine 103 can generate a flat file schema 106 based at least in part on the statistical analysis and pattern detection of the data included in the flat file 109. In some examples, the flat file schema 106 comprises a separate structured document that is structured according to the inferred schema 106. In other examples, the flat file schema 106 comprises a metadata file that defines how the flat file 109 is structured and the relationship between the various records 118 and data included in the records 118.

In some examples, the flat file schema 106 corresponds to an output of a trained schema inference model 136. In various examples, the schema inference engine 103 can train a schema inference model 136 to infer the data structure and corresponding relationships of the data included in a flat file 109. In particular, the schema inference engine 103 can train a schema inference model 136 to identify and classify the columns 115 within the flat file 109 based at least in part on historical flat files 109 and corresponding schemas 106. As such, the schema inference engine 103 can apply a flat file 109 as an input to a trained schema inference model 136 and obtain the flat file schema 106 as in output of the trained schema inference model 136.

In some examples, the schema inference engine 103 trains multiple schema inference models 136 that differ in the type of information included in the flat file 109. For example, flat files 109 provided by a first data source system 206 may be different from flat files 109 received from a second data source system 206. As such, the schema inference engine 103 can train a first schema inference model 136 in association with the first data source system 206 and a second schema inference model 136 in association with the second data source system 206.

The compliance engine 215 can be executed to analyze flat files 109 to determine whether the flat files 109 satisfy the compliance rules 221. For example, the compliance rules 221 can comprise rules associated with the storage and/or transmission of data that must be satisfied. In some examples, the compliance rules 221 correspond to privacy enforcement such as, requiring certain data to be encrypted prior to being shared with another entity and/or stored in a data storage. In other examples, the compliance rules 221 include localization rules. For example, some countries require that data associated with citizens of the country must only be stored in a data storage located in that country.

In various examples, the compliance engine 215 analyzes the data included in a flat file 109 with an understanding of the inferred flat file schema 106 to determine the compliance status of the data in the flat file 109. Using the example of the flat file 109 of FIG. 1, the compliance engine 215 can determine that the flat file 109 is stored in a data repository located in the United States, but includes data associated with an Indian transaction and/or citizen. The compliance rules 221 can indicate that the record 118 located in row 112a of the flat file 109 of FIG. 1 is non-compliant. In another example, the compliance engine 215 can determine that the account numbers located in column 115b are not encrypted as required by the compliance rules 221. As such, the compliance engine 215 can determine that the flat file 109 is not in compliance with respect to the compliance rules 221.

In various examples, the compliance engine 215 can perform an action to rectify any detected compliance issues. In some examples, the compliance engine 215 can flag the flat file 109 for manual review. In other examples, the compliance engine 215 can modifying the flat file 109. Examples of file modification can include removing the non-compliant data from the flat file 109, obfuscating the non-compliant data within the flat file 109, encrypting the non-compliant data, or other type of modification. In the example where the compliance issue relates to data localization, the compliance engine 215 can extract the non-compliant data that requires storage in a different location from the flat file 109 and transmit the extracted data to a data destination system 209 located in the compliant location.

Also, various data is stored in a computing environment data store 224 that is accessible to the computing environment 203. The computing environment data store 224 can be representative of a plurality of computing environment data stores 224, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the computing environment data store 224 is associated with the operation of the various applications or functional entities described below. This data can include flat files 109, inferred flat file schemas 106, schema inference rules 218, a schema inference model 136, compliance rules 221, and potentially other data.

The flat files 109 can represent a file comprising data stored in a plain text format with no structural markup to delineate the meaning of the data. For example, a flat file can include a delimited text file, a CSV (comma-separated values) file, and/or any other suitable flat file structure. In various examples, a flat file comprises a table of rows 112 and columns 115 where each row 112 corresponds to a record 118 of data and each column 115 corresponds to a data field 133 for a given type of data. In various examples, the flat files 109 can represent financial documents that includes transaction records 118 associated with one or more users. In some examples, the flat files 109 can correspond to flat files 109 received from a data source system 206. In other examples, the flat files 109 can correspond to files that are exchanged between various entities within the computing environment 203.

The inferred flat file schema 106 corresponds to data that identifies the structure for and the meaning of the data included in a given flat file 109. In particular, the flat file schema 106 identifies the data fields 133 corresponding to the type of data included the portion of the data of the discrete information string that is included in a corresponding column 115. In some examples, the flat file schema 106 comprises a separate structured document that is structured according to the inferred schema 106. In other examples, the flat file schema 106 comprises a metadata file that defines how the flat file 109 is structured and the relationship between the various records 118 and data included in the records 118.

The schema inference rules 218 include rules, models, and/or configuration data for the various algorithms or approaches employed by the schema inference engine 103 in inferring the flat file schema 106 for a flat file 109. For example, the schema inference rules 218 can include the statistical operations that can be used to discern the patterns within the data for identifying the rows 112 and columns 115. In addition, the schema inference rules 218 can include the regular expressions that can be used to categorize the data included in the different columns 115 in the flat file 109.

The schema inference model 136 in includes, for example, a logistic regression classifier, a random forest classifier, a decision tree classifier, a XGBoost classifier, a multi-layer perceptron classifier, a recurrent neural network, a feed-forward neural network, a label-specific attention network, and/or any other type of trained model as can be appreciated. According to various examples, the schema inference model 136 is trained using a plurality of historical flat files 109 and corresponding schemas 106 to learn how to infer the flat file schema 106 for a given flat file 109. In various examples, the schema inference model uses classification algorithms to classify the data included in a given column 115 of a flat file 109 and identify the corresponding type of data based at least in part on the historical data.

The compliance rules 221 include rules, models, and/or configuration data for the various algorithms or approaches employed by the compliance engine 215 in determining whether a flat file 109 is compliant and performing actions to rectify any non-compliant issues. The compliance rules 221 can include privacy enforcement rules, localization rules, data storage rules and/or other types of rules that must be satisfied to consider a flat file 109 in compliance.

The data source system 206 is a system that provides flat files 109 to the computing environment 203 or a data destination system 209. In one example, the data source system 206 can comprise one or more of a plurality of entity systems associated with the computing environment 203. For example, the computing environment 203 can correspond to an issuer that can provide a payment to a merchant on behalf of a consumer having an account with the issuer. In various examples, the issuer can comprise multiple entity systems that exchange data between one another.

In other examples, the data source system 206 can comprise a third-party system that is separate from the computing environment 203. For example, the data source system 206 can be associated with a merchant (e.g., a seller, a supplier, etc.) that engages in a transaction with a customer with respect to the exchange of goods and services with a payment of funds. In this example, the merchant can transmit a flat file 109 comprising a plurality of transaction records 118 to the computing environment 203 and/or data destination system 209 for storage and/or processing.

Similarly, the data destination system 209 is a system that receives flat files 109 and/or other data from the computing environment 203 and/or the data source system 206. In some examples, the data destination system 209 comprises a third-party system from the computing environment 203 and/or data source system 206. In other examples, the data destination system 209 is an entity system that is associated with the computing environment 203. For example, using the example where an issuer comprises multiple entity computing systems that exchange data between one another, a data destination system 209 can comprise a first issuer entity system and the data source system 206 can comprise a second issuer entity system. In various examples, the data destination systems 209 and data source system 206 can be located in different locations (e.g., states, countries, etc.).

It should be noted that although the computing environment 203 is shown in FIG. 2 as being a separate environment from the data destination system 209 and the data source system 206, in various examples, the data destination system 209 and/or the data source system 206 are included in the computing environment 203 and the functionality described with respect to the computing environment 203 can also be applied within the data destination system 209 and/or the data source system 206.

The data source system 206 is representative of a plurality of computing devices that can be coupled to the network 212. The data source system 206 can include a corresponding computer system or computing device with a processor and a memory. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability.

Various applications or other functionality can be executed by the data source system 206 according to various embodiments. The components executed on data source system 206 can include a data source service 227, and other applications, services, processes, systems, engines, or functionality not discussed in detail herein.

The data source service 227 can transmit flat files 109 to the computing environment 203 or data destination system 209. In various examples, the data source service 227 can generate the flat files 109. For example, assuming the data source system 206 corresponds to a merchant system, the data source service 227 can generate the flat files 109 comprising the transaction records 118 associated with transactions between the merchant and one or more consumers.

Also, various data is stored in a data source data store 230 that is accessible to the data source system 206. The data source data store 230 can be representative of a plurality of data source data stores 230, which can include relational databases, object-oriented databases, hierarchical databases, hash tables or similar key-value data stores, as well as other data storage applications or data structures. The data stored in the data source data store 230 is associated with the operation of the various applications or functional entities described below. This data can include flat files 109, and potentially other data.

The data destination system 209 is representative of a plurality of computing devices that can be coupled to the network 212. The data destination system 209 can include a corresponding computer system or computing device with a processor and a memory. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability.

Various applications or other functionality can be executed by the data destination system 209 according to various embodiments. The components executed on data destination system 209 can include a data destination service 233, and other applications, services, processes, systems, engines, or functionality not discussed in detail herein. The data destination service 233 can receive flat files 109 from the computing environment 203 and/or data source system 206.

Also, various data is stored in a data destination data store 236 that is accessible to the data destination system 209. The data destination data store 236 can be representative of a plurality of data destination data stores 236, which can include relational databases, object-oriented databases, hierarchical databases, hash tables or similar key-value data stores, as well as other data storage applications or data structures. The data stored in the data destination data store 236 is associated with the operation of the various applications or functional entities described below. This data can include flat files 109, and potentially other data.

Next, a general description of the operation of the various components of the network environment 200 is provided with reference to FIGS. 3-6. To begin, FIG. 3 is a flowchart 300 that provides one example of the operation of a portion of the schema inference engine 103 and the compliance engine 215. The flowchart of FIG. 3 provides merely an example of the many different types of functional arrangements that can be employed to implement the operation of the depicted portions of the schema inference engine 103 and the compliance engine 215. As an alternative, the flowchart of FIG. 3 can be viewed as depicting an example of elements of a method implemented within the network environment 200.

Beginning with block 303, the schema inference engine 103 obtains a flat file 109. In some examples, the schema inference engine 103 receives a flat file 109 from a data source system 206. In other examples, the schema inference engine 103 obtains the flat file 109 from the computing environment data store 224. In some examples, the schema inference engine 103 obtains the flat file 109 in response to a compliance check request of the flat files 109 located within the computing environment data store 224. In other examples, the schema inference engine 103 obtains the flat file 109 in preparation to send the flat file 109 to a data destination system 209.

At block 306, the schema inference engine 103 determines where a corresponding schema file accompanies the flat file 109. In various examples, a schema file can be stored alongside the flat file 109 and/or transmitted with the flat file 109. The schema file provides the metadata that can be used to understand and discern the structure and relationships of the data included in the flat file 109. In some instances, the flat file 109 may be lacking a corresponding schema file. For example, the schema file can suffer data loss or data corruption during transmission over the network 212. In other examples, permissions associated with a receiving data destination system 209 can prevent the corresponding schema file to be stored and/or received with the flat file 109. If there is a corresponding schema file that is stored alongside the flat file 109, the portion of the process proceeds to block 315. Otherwise, the schema inference engine 103 proceeds to block 309.

At block 309, the schema inference engine analyzes the flat file 109. In various examples, the schema inference engine 103 analyzes the data included in the flat file 109 using schema inference rules 218 to identify the rows 112 and columns 115 of a table included in the flat file 109. For example, the schema inference engine 103 can analyze the data included in the flat file 109 to identify patterns in the data representing the rows 112 and columns 115. For example, row level patterns can be identified in the data to identify the start of a record 118, thereby the start of a row 112.

Similarly, the schema inference engine 103 can identify column level patterns included in the data such as data within records 118 that start with a similar string value. In some examples, the schema inference engine 103 can recognize spaces between sections of data in a given discrete information string for a record 118 and estimate the boundaries of each column 115 based at least in part on the location of the spaces. In some examples, statistical operations can be applied on numerical columns 115 to obtain data distribution sums, minimums, maximums, means, and standard deviations associated with each discrete information string. This data can be used to identify patterns within the data included in each record 118 which can be used to estimate column boundaries.

Upon identifying the rows 112 and columns 115 associated with the data of the flat file 109, the schema inference engine 103 can analyze the data to identify the type of data represented by a given column 115. For example, the schema inference engine 103 can use regular expressions identified in the schema inference rules 218 and compare the regular expressions with the data included in a given column 115 to determine the type of data. In this example, a regular expression for an account number could be expressed using the notation of "ˆ[0-9]{15}". As such, the schema inference engine 103 can determine that a string of fifteen numbers between 0 and 9 corresponds to the account number.

In some examples, the schema inference engine 103 can apply the flat file 109 as an input to a trained schema inference model 136. According to various examples, the schema inference model 136 is trained using a plurality of historical flat files 109 and corresponding schemas 106 to learn how to infer the flat file schema 106 for a given flat file 109. In various examples, the schema inference model uses classification algorithms to classify the data included in a given column 115 of a flat file 109 and identify the corresponding type of data based at least in part on the historical data.

At block 312, the schema inference engine 103 generates the flat file schema 106 based at least in part on the analysis. According to various examples, the schema inference engine 103 can generate a flat file schema 106 based at least in part on the statistical analysis and pattern detection of the data included in the flat file 109. In particular, the flat file schema 106 defines the structure of the data included in the flat file 109 including column boundaries, row boundaries, and labels corresponding to the data fields 133 representing each type of data. In some examples, the flat file schema 106 comprises a separate structured document that is structured according to the inferred schema 106. In other examples, the flat file schema 106 comprises a metadata file that defines how the flat file 109 is structured and the relationship between the various records 118 and data included in the records 118. In some examples, the flat file schema 106 is generated as an output of the trained schema inference model 136.

At block 315, the compliance engine 215 analyzes the flat file 109 and generated flat file schema 106 to determine the compliance status associated with the flat file 109. In various examples, the compliance engine 215 analyzes the data included in a flat file 109 with an understanding of the inferred flat file schema 106 to determine the compliance status of the data in the flat file 109 based at least in part on the compliance rules 221. In particular, the compliance rules 221 can include privacy enforcement rules, localization rules, data storage rules and/or other types of rules that must be satisfied to consider a flat file 109 in compliance. If the compliance engine 215 determines that the flat file 109 is in compliance in view of the analysis of the flat file 109, flat file schema 106, and compliance rules 221, this portion of the process proceeds to completion. Otherwise, the compliance engine 215 proceeds to block 318.

At block 318, the compliance engine 215 performs an action to rectify any detected compliance issues. In some examples, the compliance engine 215 can flag the flat file 109 for manual review. In other examples, the compliance engine 215 can modifying the flat file 109. Examples of file modification can include removing the non-compliant data from the flat file 109, obfuscating the non-compliant data within the flat file 109, encrypting the non-compliant data, or other type of modification. In the example where the compliance issue relates to data localization, the compliance engine 215 can extract the non-compliant data that requires storage in a different location from the flat file 109 and transmit the extracted data to a data destination system 209 located in the compliant location. Thereafter, this portion of the process proceeds to completion.

Figure 4:
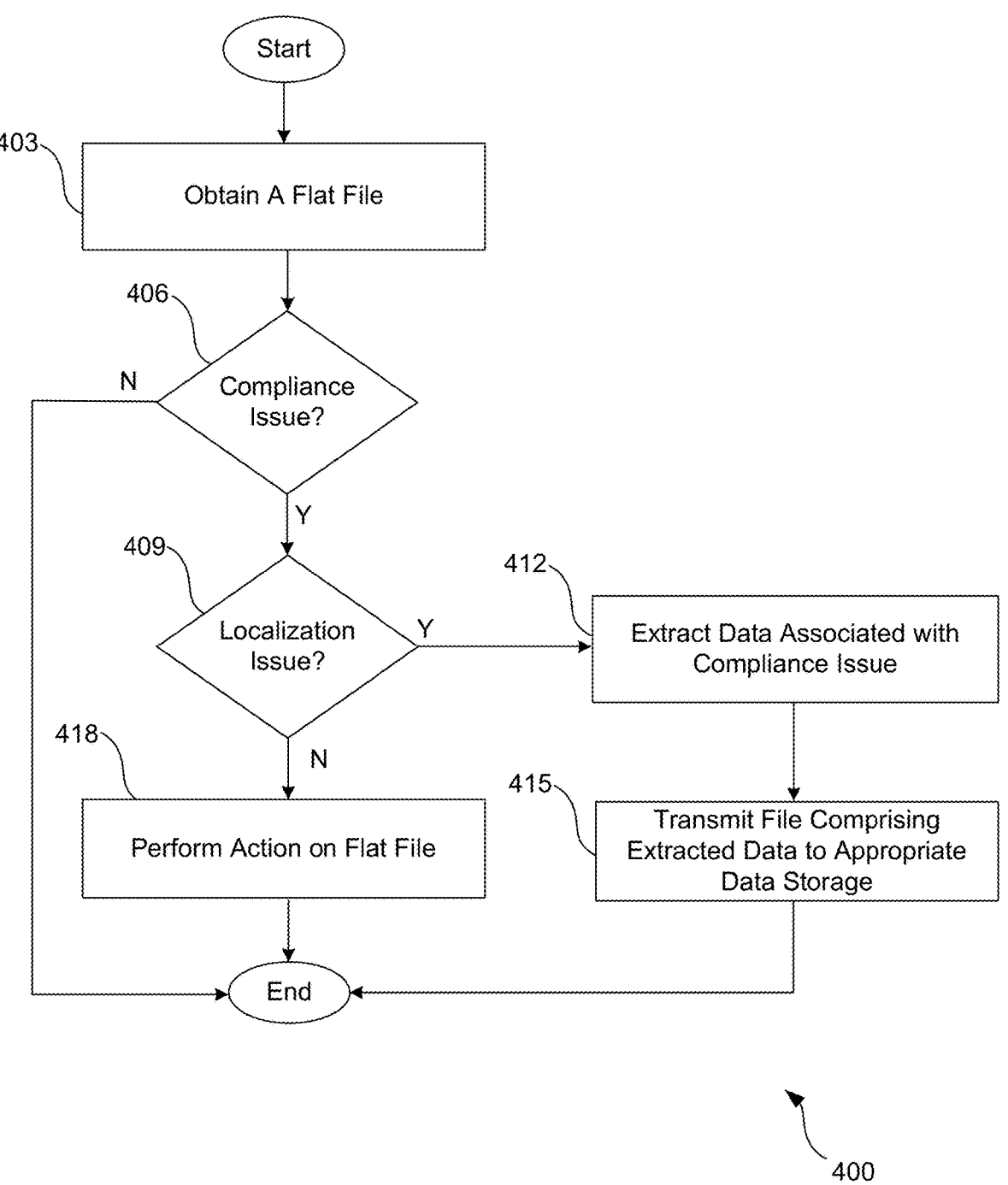
FIG. 4 is a flowchart illustrating one example of functionality implemented as portions of a compliance engine executed in a computing environment in the network environment of FIG. 2 according to various embodiments of the present disclosure. In particular, FIG. 4 relates to identifying compliance issues associated with the data based at least in part on the flat file schema and performing an action based at least in part on the compliance issue.

Referring next to FIG. 4, shown is a flowchart 400 that provides one example of the operation of a portion of the compliance engine 215. The flowchart of FIG. 4 provides merely an example of the many different types of functional arrangements that can be employed to implement the operation of the depicted portion of the compliance engine 215. As an alternative, the flowchart of FIG. 4 can be viewed as depicting an example of elements of a method implemented within the network environment 200.

Beginning with block 403, the compliance engine 215 obtains a flat file 109. In some examples, the schema inference engine 103 receives a flat file 109 from a data source system 206. In other examples, the compliance engine 215 obtains the flat file 109 from the computing environment data store 224. In some examples, the compliance engine 215 obtains the flat file 109 in response to a compliance check request of the flat files 109 located within the computing environment data store 224. In other examples, the compliance engine 215 obtains the flat file 109 in preparation to send the flat file 109 to a data destination system 209. In various examples, the compliance engine 215 obtains the flat file 109 in response to the schema inference engine 103 analyzing the flat file 109 and generating a flat file schema 106 based at least in part on the analysis.

At block 406, the compliance engine 215 determines whether a compliance issue is present with respect to the flat file 109. In various examples, the compliance engine 215 analyzes the data included in a flat file 109 with an understanding of the inferred flat file schema 106 to determine the compliance status of the data in the flat file 109 based at least in part on the compliance rules 221. In particular, the compliance rules 221 can include privacy enforcement rules, localization rules, data storage rules and/or other types of rules that must be satisfied to consider a flat file 109 in compliance. If the compliance engine 215 determines that the flat file 109 is in compliance in view of the analysis of the flat file 109, flat file schema 106, and compliance rules 221, this portion of the process proceeds to completion. Otherwise, the compliance engine 215 proceeds to block 409.

At block 409, the compliance engine 215 determines whether the compliance issue relates to localization enforcement. In some examples, some countries require that data associated with that country is stored within the country. For example, India requires that transaction data related to India must be stored in India. As such, if the compliance engine 215 identifies that transaction data in a flat file 109 that is stored outside of India includes data that is related to India, the compliance issue will correspond to a localization issue. For example, if the flat file schema 106 identifies a country code associated with the transaction record, the compliance engine 215 can identify a localization compliance issue according to the country code. If the compliance issue relates to localization, the compliance engine 215 proceeds to block 412. Otherwise, the compliance engine proceeds to block 418.

At block 412, the compliance engine 215 extracts the data from the flat file 109 that fails to satisfy the localization compliance rule. For example, if the flat file 109 is stored in the United States and some of the records 118 included in the flat file 109 correspond to records 118 related to India as determined by the flat file schema 106, the compliance engine 215 will extract and remove the non-compliant records 118 from the flat file 109 and generate a file containing the non-compliant records 118.

At block 415, the compliance engine 215 transmits the file containing the non-compliant records 118 to the data destination system 209 located in the compliant location (e.g., India). For example, the compliance engine 215 can transmit the file over the network 211 to the data destination system 209 for storage of the file in the data destination data store 236. The flat file 109 with the removed non-compliant data can also be stored in the computing environment data store 224. Thereafter, this portion of the process proceeds to completion.

At block 418, the compliance engine 215 performs an action to rectify any detected compliance issues. In some examples, the compliance engine 215 can flag the flat file 109 for manual review. In other examples, the compliance engine 215 can modifying the flat file 109. Examples of file modification can include removing the non-compliant data from the flat file 109, obfuscating the non-compliant data within the flat file 109, encrypting the non-compliant data, or other type of modification. Thereafter, this portion of the process proceeds to completion.

Figures 5, 6:
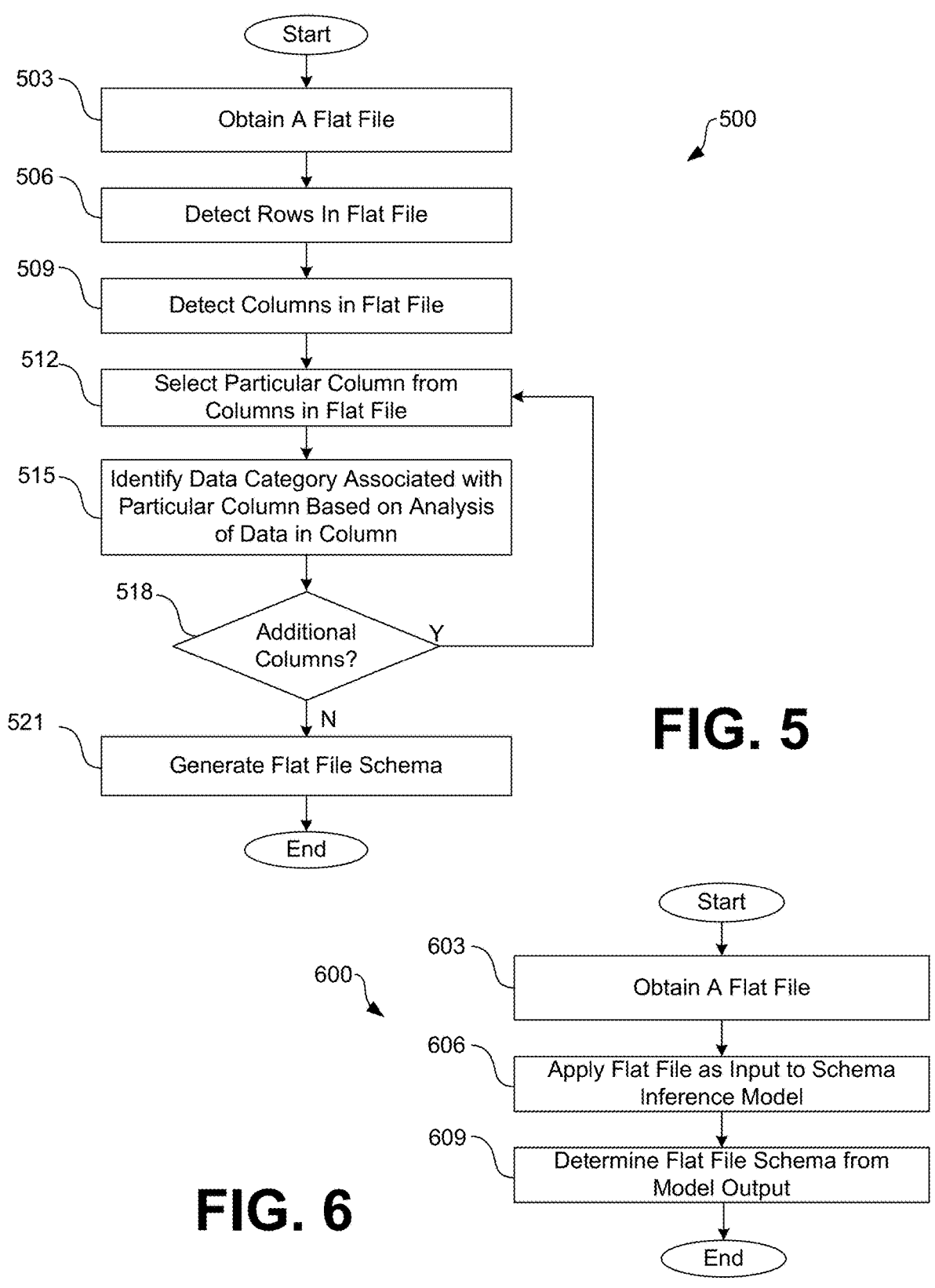
FIG. 5 is a flowchart illustrating one example of functionality implemented as portions of a schema inference engine executed in a computing environment in the network environment of FIG. 2 according to various embodiments of the present disclosure. In particular, FIG. 5 relates to analyzing a flat file to infer a flat file schema.
FIG. 6 is a flowchart illustrating one example of functionality implemented as portions of a schema inference engine executed in a computing environment in the network environment of FIG. 2 according to various embodiments of the present disclosure. In particular, FIG. 6 relates to using a trained schema inference model to infer a flat file schema for a flat file.

Referring next to FIG. 5, shown is a flowchart 500 that provides one example of the operation of a portion of the schema inference engine 103. The flowchart of FIG. 5 provides merely an example of the many different types of functional arrangements that can be employed to implement the operation of the depicted portion of the schema inference engine 103. As an alternative, the flowchart of FIG. 5 can be viewed as depicting an example of elements of a method implemented within the network environment 200.

Beginning with block 503, the schema inference engine 103 obtains a flat file 109. In some examples, the schema inference engine 103 receives a flat file 109 from a data source system 206. In other examples, the schema inference engine 103 obtains the flat file 109 from the computing environment data store 224. In some examples, the schema inference engine 103 obtains the flat file 109 in response to a compliance check request of the flat files 109 located within the computing environment data store 224. In other examples, the schema inference engine 103 obtains the flat file 109 in preparation to send the flat file 109 to a data destination system 209.

At block 506, the schema inference engine 103 identifies the rows 112 for the table of data included in the flat file 109. For example, the schema inference engine analyzes the flat file 109 and applies the schema inference rules 218 to detect, row level patterns can be identified in the data that indicate the start of a record 118, thereby the start of a row 112. In various examples, the schema inference engine 103 can apply statistical analysis and pattern detection with respect to the data to identify the start and/or end of rows 112 associated with each record 118. In some examples, the flat file 109 comprises a header 121 and/or a footer 124 that includes a verification row count 127. As such, the schema inference engine 103 can further use the row count 127 as a factor in identifying the rows 112 included in the table of data in the flat file 109.

At block 509, the schema inference engine 103 detects the columns 115 included in the flat file 109. For example, the schema inference engine 103 can identify column level patterns included in the data such as data within records 118 that start with a similar string value. In some examples, the schema inference engine 103 can recognize spaces between segments of data in a given discrete information string for a record 118 and estimate the boundaries of each column 115 based at least in part on the location of the spaces. In some examples, statistical operations can be applied on numerical columns 115 to obtain data distribution sums, minimums, maximums, means, and standard deviations associated with each discrete information string. This data can be used to identify patterns within the data included in each record 118 which can be used to estimate column boundaries.

In some examples, the data between records 118 can be analyzed to identify patterns between segments of data associated with each record 118. For example, if each record 118 comprises a string of fifteen numbers that appears to be consistent and in the same general location of the discrete information string for each record, the schema inference engine 103 can estimate the column boundaries associated with the location of the string of numbers in each record 118.

At block 512, the schema inference engine 103 selects a particular column 115 from the detected columns 115. In some examples, the particular column 115 is selected according to a location in the table of the flat file 109. For example, the particular column 115 can comprise the first detected column 115 and/or any subsequent detected column 115. In some examples, the particular column 115 is selected randomly.

At block 515, the schema inference engine 103 identifies a data category associated with the particular column 115 based at least in part on an analysis of the data included in each of the records 118 for the given location. For example, the schema inference engine 103 can analyze the data to identify the type of data represented by a given column 115. In some examples, the schema inference engine 103 can use regular expressions identified in the schema inference rules 218 and compare the regular expressions with the data included in a given column 115 to determine the type of data. In this example, a regular expression for an account number could be expressed using the notation of "^[0-9]{15}". As such, the schema inference engine 103 can determine that a string of fifteen numbers between 0 and 9 corresponds to the account number. In various examples, the schema inference rules 218 can have regular expressions or other types of pattern detectors for types of data that are typically included in the type of flat file 109 being analyzed. For example, in the case of a financial document comprising transaction records, the schema inference rules 218 can regular expressions or pattern detectors associated with identifying data types such as account name, an account number, a transaction amount, a country code, and/or other data that is typically included in a transaction record 118.

In some examples, the schema inference engine 103 can verify the accuracy of the column boundary based at least in part on the data field 133 identified for the column 115. For example, the header 121 and/or the footer 124 of the flat file 109 can contain a verification sum corresponding to a given data field 133 of the flat file 109. In FIG. 1, the flat file 109 includes an amount sum 130 that corresponds to the sum of the values included in the data field 133a corresponding to the transaction amount. In various examples, when the schema inference engine 103 identifies the data field 133 corresponding to the verification sum, the schema inference engine 103 can determine a sum of the values associated with the column 115 for each record and verify if the sum of the values matches the verification sum included in the footer 124 and/or header 121 of the flat file 109.

At block 518, the schema inference engine 103 determines whether there are additional columns 115 to evaluate in the table of data in the flat file 109. If there are additional columns 115, the schema inference engine 103 returns to block 512. Otherwise, the schema inference engine 103 proceeds to block 521.

At block 521, the schema inference engine 103 generates the flat file schema 106 for the flat file 109. According to various examples, the schema inference engine 103 can generate a flat file schema 106 based at least in part on the statistical analysis and pattern detection of the data included in the flat file 109. In particular, the flat file schema 106 defines the structure of the data included in the flat file 109 including column boundaries, row boundaries, and labels corresponding to the data fields 133 representing each type of data. In some examples, the flat file schema 106 comprises a separate structured document that is structured according to the inferred schema 106. In other examples, the flat file schema 106 comprises a metadata file that defines how the flat file 109 is structured and the relationship between the various records 118 and data included in the records 118. Thereafter, this portion of the process proceeds to completion.

Referring next to FIG. 6, shown is a flowchart 600 that provides one example of the operation of a portion of the schema inference engine 103. The flowchart of FIG. 6 provides merely an example of the many different types of functional arrangements that can be employed to implement the operation of the depicted portion of the schema inference engine 103. As an alternative, the flowchart of FIG. 6 can be viewed as depicting an example of elements of a method implemented within the network environment 200.

Beginning with block 603, the schema inference engine 103 obtains a flat file 109. In some examples, the schema inference engine 103 receives a flat file 109 from a data source system 206. In other examples, the schema inference engine 103 obtains the flat file 109 from the computing environment data store 224. In some examples, the schema inference engine 103 obtains the flat file 109 in response to a compliance check request of the flat files 109 located within the computing environment data store 224. In other examples, the schema inference engine 103 obtains the flat file 109 in preparation to send the flat file 109 to a data destination system 209.

At block 606, the schema inference engine 103 applies the flat file 109 as an input to a schema inference model 136. According to various examples, the schema inference model 136 is trained using a plurality of historical flat files 109 and corresponding schemas 106 to learn how to infer the flat file schema 106 for a given flat file 109. In various examples, the schema inference model uses classification algorithms to classify the data included in a given column 115 of a flat file 109 and identify the corresponding type of data based at least in part on the historical data.

At block 609, the schema inference engine 103 determines a flat file schema 106 for the flat file 109 based at least in part on the output of the schema inference model 136. In particular, the flat file schema 106 defines the structure of the data included in the flat file 109 including column boundaries, row boundaries, and labels corresponding to the data fields 133 representing each type of data. In some examples, the flat file schema 106 comprises a separate structured document that is structured according to the inferred schema 106. In other examples, the flat file schema 106 comprises a metadata file that defines how the flat file 109 is structured and the relationship between the various records 118 and data included in the records 118. Thereafter, this portion of the process proceeds to completion.

Functionality attributed to the schema inference engine 103 and the compliance engine 215 can be implemented in a single process or application or in multiple processes or applications. The separation or segmentation of functionality as discussed herein is presented for illustrative purposes only.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine-readable instructions stored in the memory that, when executed by the processor, cause the computing device to at least:
obtain a flat file from a data storage or a third-party computing device;
determine that the flat file lacks a corresponding schema file;
apply the flat file as an input to a trained schema inference model, wherein the trained schema inference model uses one or more classification algorithms to classify the data included in one or more columns of the flat file and identify a corresponding data type based at least in part on historical flat files and corresponding historical flat file schemas;
determine a flat file schema based at least in part on an output of the trained schema inference model;
identify a compliance issue associated with at least a portion of the data represented by the flat file based at least in part on the flat file, the flat file schema, and at least one compliance rule; and
perform an action to rectify the compliance issue.

2. The system of claim 1, wherein the at least one compliance rule comprises at least one of a privacy enforcement rule, a localization rule, or a data storage rule.

3. The system of claim 1, wherein the action comprises at least one of: flagging the flat file for a manual review, modifying the flat file to remove the at least the portion of the data from the flat file, modifying the flat file to obfuscate the at least the portion of the data within the flat file, or encrypting the at least the portion of the data according to the at least one compliance rule.

4. The system of claim 1, wherein the flat file is obtained from the data storage located at a first location, and the compliance issue corresponds to the at least the portion of the data being stored in the first location.

5. The system of claim 4, wherein, when executed, the machine-readable instructions further cause the computing device to at least:

extract the at least the portion of the data from the flat file; and transmit the at least the portion of the data to a second data storage in a second location.

6. The system of claim 1, wherein, when executed, the machine readable instructions further cause the computing device to select the trained schema inference model from a plurality of trained schema inference models based at least in part on a type of information included in the flat file.

7. The system of claim 1, wherein the flat file comprises a plurality of financial records associated with a plurality of consumers, and the data storage or the third-party computing device corresponds to a merchant computing system.

8. A method, comprising:

obtaining a flat file from a data storage or a third-party computing device;

determining that the flat file lacks a corresponding schema file;

applying the flat file as an input to a trained schema inference model, wherein the trained schema inference model uses one or more classification algorithms to classify the data included in one or more columns of the flat file and identify a corresponding data type based at least in part on historical flat files and corresponding historical flat file schemas;

determining a flat file schema based at least in part on an output of the trained schema inference model;

identifying a compliance issue associated with at least a portion of the data represented by the flat file based at least in part on the flat file, the flat file schema, and at least one compliance rule; and performing an action to rectify the compliance issue.

9. The method of claim 8, wherein the at least one compliance rule comprises at least one of a privacy enforcement rule, a localization rule, or a data storage rule.

10. The method of claim 8, wherein the action comprises at least one of:

flagging the flat file for a manual review, modifying the flat file to remove the at least the portion of the data from the flat file, modifying the flat file to obfuscate the at least the portion of the data within the flat file, or encrypting the at least the portion of the data according to the at least one compliance rule.

11. The method of claim 8, wherein the flat file is obtained from the data storage located at a first location, and the compliance issue corresponds to the at least the portion of the data being stored in the first location.

12. The method of claim 11, further comprising:

extracting the at least the portion of the data from the flat file; and transmitting the at least the portion of the data to a second data storage in a second location.

13. The method of claim 8, further comprising selecting the trained schema inference model from a plurality of trained schema inference models based at least in part on a type of information included in the flat file.

14. The method of claim 8, wherein the flat file comprises a plurality of financial records associated with a plurality of consumers, and the data storage or the third-party computing device corresponds to a merchant computing system.

15. A non-transitory, computer-readable medium, comprising machine-readable instructions that, when executed by a processor of a computing device, cause the computing device to at least:

obtain a flat file from a data storage or a third-party computing device;

determine that the flat file lacks a corresponding schema file;

apply the flat file as an input to a trained schema inference model, wherein the trained schema inference model uses one or more classification algorithms to classify the data included in one or more columns of the flat file and identify a corresponding data type based at least in on part historical flat files and corresponding historical flat file schemas;

determine a flat file schema based at least in part on an output of the trained schema inference model;

identify a compliance issue associated with at least a portion of the data represented by the flat file based at least in part on the flat file, the flat file schema, and at least one compliance rule; and perform an action to rectify the compliance issue.

16. The non-transitory, computer-readable medium of claim 15, wherein the at least one compliance rule comprises at least one of a privacy enforcement rule, a localization rule, or a data storage rule.

17. The non-transitory, computer-readable medium of claim 15, wherein the action comprises at least one of: flagging the flat file for a manual review, modifying the flat file to remove the at least the portion of the data from the flat file, modifying the flat file to obfuscate the at least the portion of the data within the flat file, or encrypting the at least the portion of the data according to the at least one compliance rule.

18. The non-transitory, computer-readable medium of claim 15, wherein the flat file is obtained from the data storage located at a first location, and the compliance issue corresponds to the at least the portion of the data being stored in the first location.

19. The non-transitory, computer-readable medium of claim 18, wherein the machine-readable instructions, when executed by the processor, further cause the computing device to at least:

extract the at least the portion of the data from the flat file; and transmit the at least the portion of the data to a second data storage in a second location.

20. The non-transitory, computer readable medium of claim 15, wherein the flat file comprises a plurality of financial records associated with a plurality of consumers, and the data storage or the third-party computing device corresponds to a merchant computing system.

* * * * *